United States Patent
Tamura et al.

(10) Patent No.: US 10,849,030 B2
(45) Date of Patent: Nov. 24, 2020

(54) METHOD AND BASE STATION FOR CELL SPLITTING IN A WIRELESS COMMUNICATION NETWORK

(71) Applicant: NEC Corporation, Minato-ku, Tokyo (JP)

(72) Inventors: Tomu Tamura, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/302,698

(22) PCT Filed: Feb. 5, 2015

(86) PCT No.: PCT/JP2015/053282
§ 371 (c)(1),
(2) Date: Oct. 7, 2016

(87) PCT Pub. No.: WO2015/159574
PCT Pub. Date: Oct. 22, 2015

(65) Prior Publication Data
US 2017/0034750 A1    Feb. 2, 2017

(30) Foreign Application Priority Data
Apr. 17, 2014  (JP) ................................ 2014-085221

(51) Int. Cl.
*H04W 4/00* (2018.01)
*H04W 36/00* (2009.01)
(Continued)

(52) U.S. Cl.
CPC ....... *H04W 36/0061* (2013.01); *H04W 48/10* (2013.01); *H04W 24/02* (2013.01); *H04W 84/12* (2013.01)

(58) Field of Classification Search
CPC . H04W 36/0061; H04W 48/10; H04W 24/02; H04W 84/12
See application file for complete search history.

(56) References Cited

U.S. PATENT DOCUMENTS 8,442,007 B2    5/2013   Liu
8,849,282 B2    9/2014   Serravalle et al.
(Continued)

FOREIGN PATENT DOCUMENTS

JP    2011-250174 A    12/2011
JP    2012-191353 A    10/2012
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS36.300 V12.1.0 (Mar. 2014).
(Continued)

*Primary Examiner* — Abdelnabi O Musa

(57) ABSTRACT

A base station includes a storage unit stores a neighbour relation table and a processing unit. The processing unit receives service information of a neighbour cell to its own cell, the service information being transmitted by another base station forming the neighbour cell to the own cell, the service information including at least one of an information element indicating whether the another base station has a function of a wireless LAN (Local Area Network) base station and an information element indicating whether the neighbour cell is a cell for dynamically adding a communication capacity. The processing unit registers the service information of the neighbour cell with the neighbour relation table.

7 Claims, 7 Drawing Sheets

(51) Int. Cl.
*H04W 48/10* (2009.01)
*H04W 24/02* (2009.01)
*H04W 84/12* (2009.01)

(56) References Cited

U.S. PATENT DOCUMENTS

| | | | |
|---|---|---|---|
| 9,973,982 B1* | 5/2018 | Oroskar | H04W 36/0061 |
| 2012/0135771 A1 | 5/2012 | Futaki | |
| 2012/0142356 A1 | 6/2012 | Serravalle et al. | |
| 2012/0329461 A1* | 12/2012 | Teyeb | H04W 36/0061 |
| | | | 455/437 |
| 2013/0021929 A1 | 1/2013 | Kim | |
| 2013/0150056 A1* | 6/2013 | Yi | H04W 36/04 |
| | | | 455/444 |
| 2014/0056135 A1 | 2/2014 | Hapsari et al. | |
| 2014/0169197 A1* | 6/2014 | Damnjanovic | H04W 48/18 |
| | | | 370/252 |
| 2014/0355562 A1* | 12/2014 | Gao | H04W 76/025 |
| | | | 370/331 |
| 2015/0189522 A1 | 7/2015 | Hu et al. | |
| 2015/0365860 A1* | 12/2015 | Yu | H04W 36/04 |
| | | | 455/444 |
| 2016/0014592 A1* | 1/2016 | Park | H04W 36/04 |
| | | | 370/331 |
| 2016/0037406 A1* | 2/2016 | Centonza | H04W 36/04 |
| | | | 370/332 |
| 2016/0044518 A1* | 2/2016 | Centonza | H04W 24/02 |
| | | | 370/328 |
| 2016/0157155 A1* | 6/2016 | Chiba | H04W 76/041 |
| | | | 455/436 |
| 2016/0212775 A1* | 7/2016 | Xu | H04W 76/10 |
| 2017/0034750 A1 | 2/2017 | Tamura et al. | |
| 2017/0188277 A1* | 6/2017 | Siomina | H04W 36/18 |

FOREIGN PATENT DOCUMENTS

| | | |
|---|---|---|
| JP | 2013-502749 A | 1/2013 |
| JP | 2013-172406 A | 9/2013 |
| JP | 2013-250174 A | 12/2013 |
| WO | 2014/040225 A1 | 3/2014 |
| WO | 2015/159574 A1 | 10/2015 |

OTHER PUBLICATIONS

3rd Generation Partnership Project; Technical Specification Group Radio Access Network; Study on Small Cell enhancements for E-UTRA and E-UTRAN; Higher layer aspects (Release 12), 3GPP TR36.842 V12.0.0 (Dec. 2013).

3rd Generation Partnership Project; Technical Specification Group Radio Access Network; Automatic Neighbour Relation (ANR) for UTRAN; Stage 2 (Release 11), 3GPP TS25.484 V11.1.0 (Mar. 2013).

3rd Generation Partnership Project; Technical Specification Group Radio Access Network; Evolved Universal Terrestrial Radio Access (E-UTRA); Radio Resource Control (RRC); Protocol specification (Release 12), 3GPP TS36.331 V12.1.0 (Mar. 2014).

3rd Generation Partnership Project; Technical Specification Group Radio Access Network; Radio Resource Control (RRC); Protocol specification (Release 12), 3GPP TS25.331 v12.1.0 (Mar. 2014).

3rd Generation Partnership Project; Technical Specification Group Radio Access Network; Evolved Universal Terrestrial Radio Access Network (E-UTRAN); S1 Application Protocol (S1AP) (Release 12), 3GPP TS36.413 V12.1.0 (Mar. 2014).

3rd Generation Partnership Project; Technical Specification Group Radio Access Network; Evolved Universal Terrestrial Radio Access (E-UTRA); User Equipment (UE) radio access capabilities (Release 12), 3GPP TS36.306 V12.0.0 (Mar. 2014).

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12), 3GPP TS37.320 V12.0.0 (Mar. 2014).

3rd Generation Partnership Project; Technical Specification Group Radio Access Network; Study on next generation Self-Optimizing Network (SON) for UTRAN and E-UTRAN; (Release 12), 3GPP TR37.822 V1.2.0 (Nov. 2013).

"Considerations on requirements and scenarios of WLAN/3GPP Radio Interworking", New Postcom, 3GPP TSG-RAN WG2 Meeting #81, R2-130270, Internet <URL: http://www.3gpp.org/ftp/tsg_ran/WG2_RL2/TSGR2_81/Docs/R2-130270.zip>, St. Julian's, Malta, Jan. 28-Feb. 1, 2013.

International Search Report for PCT Application No. PCT/JP2015/053282, dated May 12, 2015.

English translation of Written opinion for PCT Application No. PCT/JP2015/053282.

Siemens: "LTE neighbourhood list and measurement organisation Document: Discussion and decision", 3GPP Draft; R2-063189, 3rd Generation Partnership Project, Mobile Competence Centre; 650, Route Des Lucioles; F-06921 Sophia-Antipolis Cedex; France, vol. RAN WG2, Riga, Latvia; Nov. 1, 2006, 4 pages.

NSN et al: "Configuration of WLAN IDs and RSRP/RSRQ Thresholds in WLAN/3GPP Radio Interworking", 3GPP Draft; R2-141582 (Son Aspects of 3GP WLAN Interworking), 3rd Generation Partnership Project, Mobile Competence Centre; 650, Route Des Lucioles; F-06921 Sophia-Antipolis Cedex; France vol. RAN WG2, No. Valencia, Spain; Mar. 22, 2014, 4 pages.

Extended European Search Report for EP Application No. EP15779732.5 dated Aug. 9, 2017.

3rd Generation Partnership Project, "Analysis of the impact of AAS-based techniques on SON features", 3GPP TSG-RAN WG3 Meeting #81-bis, Oct. 7-11, 2013, R3-131763, Venice, Italy.

3rd Generation Partnership Project, "Using AAS for coverage modification", 3GPP TSG-RAN WG3 Meeting #81, Aug. 19-23, 2013, R3-131531, Barcelona, Spain.

3rd Generation Partnership Project, "Impact of coverage modifications", 3GPP TSG-RAN WG3 Meeting #81bis, Oct. 7-11, 2013, R3-131659, Venice, Italy.

Japanese Office Action for JP Application No. 2016-513655 dated Jan. 9, 2018 with English Translation.

Indian Office Action for in Application No. 201617034789 dated Dec. 26, 2019 with English Translation.

Japanese Office Action for JP Application No. 2018-179905 dated Dec. 3, 2019 with English Translation.

* cited by examiner

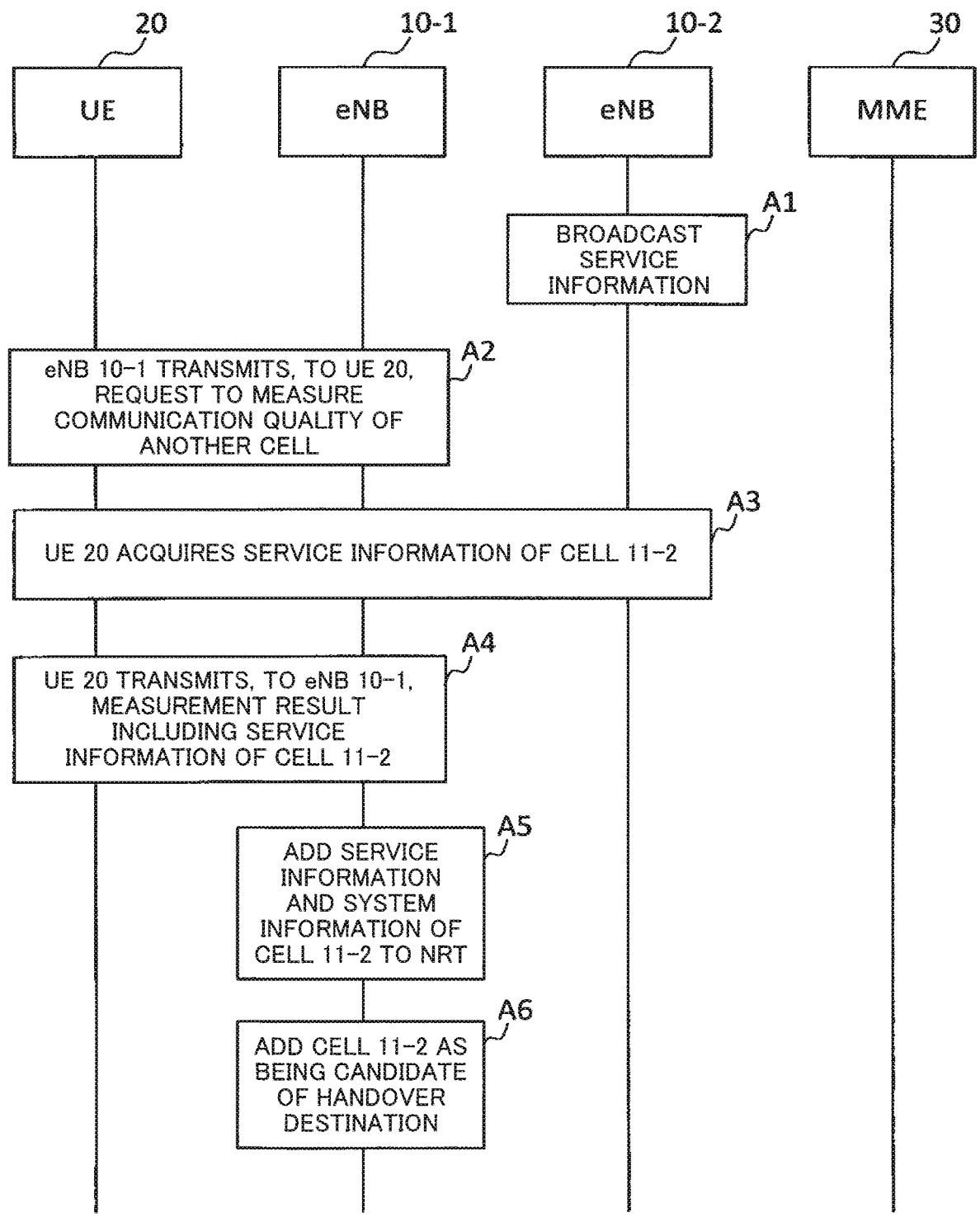

Fig. 4

SystemInformationBlockType1 message

```
-- ASN1START
SystemInformationBlockType1 ::=       SEQUENCE {
    cellAccessRelatedInfo             SEQUENCE {
        plmn-IdentityList             PLMN-IdentityList,
        trackingAreaCode              TrackingAreaCode,
        cellIdentity                  CellIdentity,
        cellBarred                    ENUMERATED {barred, notBarred},
        intraFreqReselection          ENUMERATED {allowed, notAllowed},
        csg-Indication                BOOLEAN,
        csg-Identity                  CSG-Identity        OPTIONAL -- Need OR
    }, (OMITTED)

CellSelectionInfo-v920 ::=            SEQUENCE {
    q-QualMin-r9                      Q-QualMin-r9,
    q-QualMinOffset-r9                INTEGER (1..8)                          OPTIONAL -- Need OP
}

CellSelectionInfo-v1130 ::=           SEQUENCE {
    q-QualMinWB-r11                   Q-QualMin-r9
}

-- Neighbour capability information
    capacity-booster-cell-Capable     BOOLEAN                                 OPTIONAL,
    WLAN-Capable                      BOOLEAN                                 OPTIONAL

-- ASN1STOP
```

Fig. 7

| NEIGHBOUR CELL | capacity-booster-cell-Capable | wLAN-Capable | ... |
|---|---|---|---|
| E-UTRAN CELL 11-2 | FALSE | TRUE | ... |
| E-UTRAN CELL 11-3 | TRUE | FALSE | ... |
| E-UTRAN CELL 11-4 | FALSE | FALSE | ... |
| E-UTRAN CELL 11-5 | FALSE | FALSE | ... |
| ... | ... | ... | ... |

METHOD AND BASE STATION FOR CELL SPLITTING IN A WIRELESS COMMUNICATION NETWORK

This application is a National Stage Entry of PCT/JP2015/053282 filed on Feb. 5, 2015, which claims priority from Japanese Patent Application 2014-085221 filed on Apr. 17, 2014, the contents of all of which are incorporated herein by reference, in their entirety.

TECHNICAL FIELD

The present invention relates to a base station, a wireless communication system, and a communication method.

BACKGROUND ART

Firstly, independent three techniques relevant to the present invention are described.

(A) 3GPP TS (3rd Generation Partnership Project Technical Specification) 36.300 V12.1.0 (NPL 1) prescribes a function called Energy Saving. This function refers to a function of, in an environment where an E-UTRAN Node B (hereinafter, eNB) in an Evolved Universal Terrestrial Radio Access Network (E-UTRAN) forms a cell providing basic coverage, automatically switching the power on/off of an antenna by another base station disposed within the coverage. For example, when large-volume traffic occurs temporarily in a relatively narrow area within the coverage, the antenna of the above-described base station is powered on to add a cell. This enables dynamic addition of a communication capacity. In this manner, a cell for switching the power on/off of an antenna is expected to accommodate large-volume traffic that occurs temporarily in a relatively narrow area. This cell is called as a "capacity booster cell" in 3GPP TS36.300 V12.1.0 (NPL 1), and is called a "cell for dynamically adding a communication capacity" in the present Description.

(B) Operation where a UE uses radio resources provided by at least two eNBs connected with non-ideal backhaul (e.g., X2 interface) is called "dual connectivity." This is defined in 3GPP TR (3GPP Technical Report) 36.842 V12.0.0 (NPL 2). A User Equipment (hereinafter, referred to as a UE) communicates with a Master eNB (hereinafter, referred to as an MeNB) in part of cells of a Master Cell Group (hereinafter, referred to as an MCG) formed by the MeNB. In addition, the UE communicates with a Secondary eNB (hereinafter, referred to as an SeNB) in part of cells of a Secondary Cell Group (hereinafter, referred to as an SCG) formed by the SeNB. Since the SeNB is an additional node, the SCG is also additional.

(C) In order to support traffic increase, a telecommunications carrier disposes an eNB that has both the function of a Long-Term Evolution (LTE) base station, a 3rd-Generation (3G) base station, or a Global System for Mobile Communication (GSM) base station and the function of a wireless Local Area Network (LAN) base station. Then, the eNB concurrently forms an LTE cell, a 3G cell, or a GSM cell and a wireless LAN cell. With this configuration, the load on the network can be reduced.

CITATION LIST

Patent Literature

PTL 1: Japanese Translation of PCT International Application Publication No. JP-T-2013-502749

PTL 2: Japanese Unexamined Patent Application Publication No. 2013-172406

PTL 3: Japanese Unexamined Patent Application Publication No. 2013-250174

Non Patent Literature

NPL 1: 3GPP TS36.300 V12.1.0
NPL 2: 3GPP TR36.842 V12.0.0
NPL 3: 3GPP TS25.484 V11.1.0
NPL 4: 3GPP TS36.331 V12.1.0
NPL 5: 3GPP TS25.331 v12.1.0
NPL 6: 3GPP TS36.413 V12.1.0
NPL 7: 3GPP TS36.306 V12.0.0
NPL 8: 3GPP TS37.320 V12.0.0
NPL 9: 3GPP TR37.822 V1.2.0

SUMMARY OF INVENTION

Technical Problem

Automatic Neighbour Relation (hereinafter, ANR) prescribed in 3GPP TS36.300 V12.1.0 (NPL 1) refers to a function of enabling automatic execution of the following operation by a system without operator's management. Firstly, an eNB instructs a UE to collect and report system information broadcasted in each neighbour cell. The eNB then constructs a Neighbour Relation Table (hereinafter, referred to as an NRT) based on the report from the UE. A neighbour cell herein includes not only a peripheral cell adjacent to its own cell, but also a cell that is in an inclusion relation with the own cell (e.g., a cell of a macro base station and a cell of a femto base station or the like disposed in the cell are in an inclusion relation). The eNB then determines a cell appropriate as a handover destination or a reselection destination based on the NRT, and notifies the UE of the determined cell. A similar function in a UTRAN is prescribed in 3GPP TS25.484 V11.1.0 (NPL 3). In 3GPP, the ANR is regarded as part of a Self-organizing network (hereinafter, SON) function. Note that PTLs 1 to 3 also disclose that a UE measures the communication quality of each neighbour cell and reports the measured communication quality to a network.

The ANR utilizes system information of a cell defined in 3GPP TS36.331 v12.1.0 (NPL 4) and 3GPP TS25.331 v12.1.0 (NPL 5). The UE measures the communication quality based on the received system information, and reports information such as the communication quality, a cell ID, and a Tracking area ID (TAI) to a network.

However, the system information defined in 3GPP TS36.331 v12.1.0 (NPL 4) and 3GPP TS25.331 v12.1.0 (NPL 5) may alone be insufficient for an eNB to determine a handover destination cell of a UE in some cases.

Therefore, the objective of the present invention is to provide a base station, a wireless communication system, and a communication method that enable to solve the above-described problem.

Solution to Problem

A base station of the present invention includes:
a storage unit; and
a processing unit, wherein
the storage unit stores a neighbour relation table, and
the processing unit receives service information of a neighbour cell that is transmitted by another base station forming the neighbour cell adjacent to its own cell and that includes at least one of an information element indicating whether the other base station has a function of a wireless LAN base station and an information element indicating whether the neighbour cell is a cell for dynamically adding a communication capacity, and registers the service information of the neighbour cell with the neighbour relation table.

A wireless communication system of the present invention includes:

a terminal; and a plurality of base stations, wherein each of the plurality of base stations receives service information of a neighbour cell that is transmitted by another base station forming the neighbour cell adjacent to a its own cell and that includes at least one of an information element indicating whether the other base station has a function of a wireless LAN base station and an information element indicating whether the neighbour cell is a cell for dynamically adding a communication capacity, and registers the service information of the neighbour cell with a neighbour relation table.

A communication method of the present invention is a communication method by a base station, and includes:

a reception step of receiving service information of a neighbour cell that is transmitted by another base station forming the neighbour cell adjacent to a its own cell and that includes at least one of an information element indicating whether the other base station has a function of a wireless LAN base station and an information element indicating whether the neighbour cell is a cell for dynamically adding a communication capacity; and a registration step of registering the service information of the neighbour cell with a neighbour relation table.

Advantageous Effects of Invention

The present invention produces an advantageous effect that a base station is able to obtain sufficient information to determine a handover destination cell of a terminal.

BRIEF DESCRIPTION OF DRAWINGS

FIG. 3 is a sequence diagram illustrating an example of a processing sequence during construction of an NRT in the wireless communication system according to the present exemplary embodiment.

FIG. 4 is a diagram illustrating an example of service information in the wireless communication system according to the present exemplary embodiment.

FIG. 7 is a diagram illustrating an example of the NRT in the wireless communication system according to the present exemplary embodiment.

DESCRIPTION OF EMBODIMENTS

The following describes an exemplary embodiment for carrying out the present invention with reference to the drawings.

Figure 1:
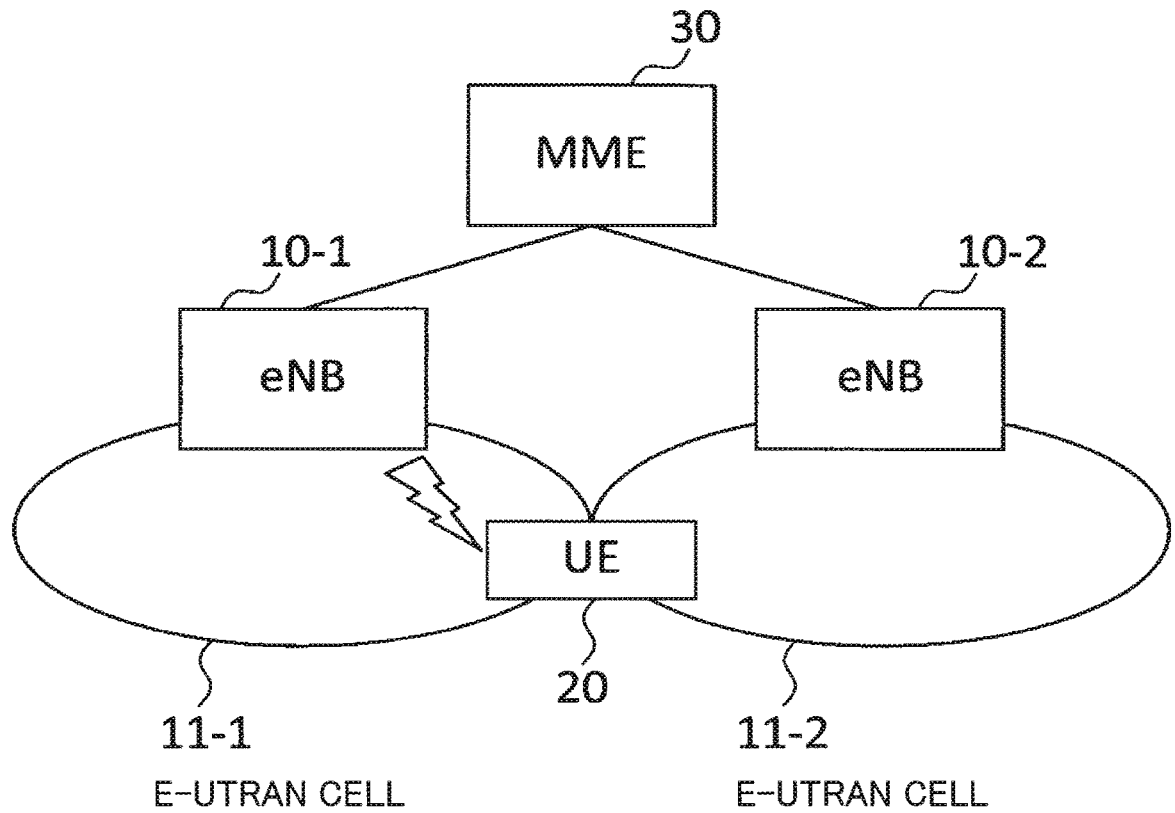
FIG. 1 is a diagram illustrating an example of the entire configuration of a wireless communication system according to the present exemplary embodiment.

(1) Configuration of Exemplary Embodiment (1-1) Entire Configuration of Wireless Communication System FIG. 1 is a diagram illustrating the entire configuration of a wireless communication system according to the present exemplary embodiment.

As illustrated in FIG. 1, the wireless communication system according to the present exemplary embodiment includes an eNB 10-1, an eNB 10-2, a UE 20, and a mobility management entity (MME) 30.

The eNB 10-1 is a base station that forms an E-UTRAN cell 11-1.

The eNB 10-2 is a base station that forms an E-UTRAN cell 11-2.

The UE 20 is a terminal that communicates with the eNBs 10-1 and 10-2.

The MME 30 is a mobility management server that forms an Evolved Packet Core (hereinafter, referred to as an EPC).

Note that, hereinafter, the eNBs 10-1 and 10-2 are simply referred to as eNBs 10 in the case where they are not distinguished.

In addition, for the convenience of illustration, there are two eNBs 10 and one UE 20 illustrated in FIG. 1. However, eNBs 10 and UEs 20 other than the above may exist.

(1-2) Configuration of eNB 10

Figure 2:
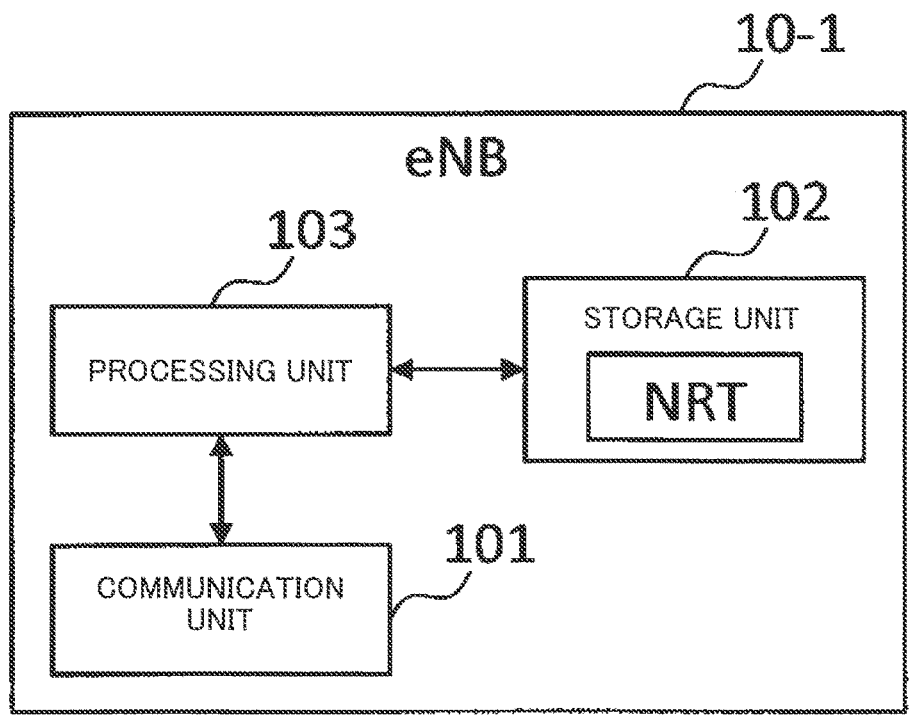
FIG. 2 is a block diagram illustrating an example of the configuration of the eNB illustrated in FIG. 1.

FIG. 2 is a block diagram illustrating an example of the configuration of the eNB 10-1 illustrated in FIG. 1.

As illustrated in FIG. 2, the eNB 10-1 includes a communication unit 101, a storage unit 102, and a processing unit 103.

The communication unit 101 communicates with outside.

The storage unit 102 stores a neighbour relation table (NRT) or the like with which service information or the like of each neighbour cell adjacent to the E-UTRAN cell 11-1 is registered.

The processing unit 103 performs, for example, the following processing of:

broadcasting service information of the E-UTRAN cell 11-1 within the E-UTRAN cell 11-1 via the communication unit 101;

receiving service information of each neighbour cell adjacent to the E-UTRAN cell 11-1 via the communication unit 101;

constructing an NRT;

determining a handover destination cell of the UE 20 based on the NRT; and notifying the UE 20 of the handover destination cell via the communication unit 101.

Note that the configuration of the eNB 10-2 is the same as that of the eNB 10-1.

(2) Operation of Present Exemplary Embodiment

The following describes the operation of the wireless communication system according to the present exemplary embodiment.

(2-1) Operation of Constructing NRT

Firstly, the operation of constructing an NRT is described.

FIG. 3 is a sequence diagram illustrating an example of a processing sequence during construction of an NRT. FIG. 4 is a diagram illustrating an example of service information.

The following describes Steps in FIG. 3.

Step A1:

The processing unit 103 of the eNB 10-2 broadcasts, within the E-UTRAN cell 11-2, service information of the E-UTRAN cell 11-2 as illustrated in FIG. 4, as being system information. In FIG. 4, underlined "capacity-booster-cell-Capable" and "wLAN-Capable" are newly added information elements.

"capacity-booster-cell-Capable" is an information element indicating whether the E-UTRAN cell 11-2 is a cell for dynamically adding a communication capacity.

"wLAN-Capable" is an information element indicating whether the eNB 10-2 forming the E-UTRAN cell 11-2 has a function of a wireless LAN base station.

Step A2:

The processing unit 103 of the eNB 10-1 transmits, to the UE 20, a request to measure the communication quality of another cell in order to make the UE 20 to report service information of the other cell.

Step A3:

The UE 20 acquires the service information of the E-UTRAN cell 11-2 that is broadcasted within the E-UTRAN cell 11-2 by the eNB 10-2.

Step A4:

The UE 20 reports, to the eNB 10-1, a measurement result including the service information of the E-UTRAN cell 11-2.

Step A5:

The processing unit 103 of the eNB 10-1 adds the service information of the E-UTRAN cell 21 to an NRT. Accordingly, the NRT of the eNB 10-1 includes the E-UTRAN cell 21 added as being a neighbour cell. At this time, the value of "capacity-booster-cell-Capable" and the value of "wLAN-Capable" in the service information of the UTRAN cell 21 are set to corresponding attribute values.

Step A6:

The processing unit 103 of the eNB 10-1 newly adds the E-UTRAN cell 11-2 as being a candidate of a handover destination cell. In other words, the E-UTRAN cell 11-2 is a target for measurement of the communication quality in the next transmission of the measurement request. Consequently, the UE 20 that receives the measurement request for the next time acquires the service information of the E-UTRAN cell 11-2, and measures the communication quality of the E-UTRAN cell 11-2 based on the acquired service information.

(2-2) Handover Operation

Next, the handover operation is described.

Figure 5:
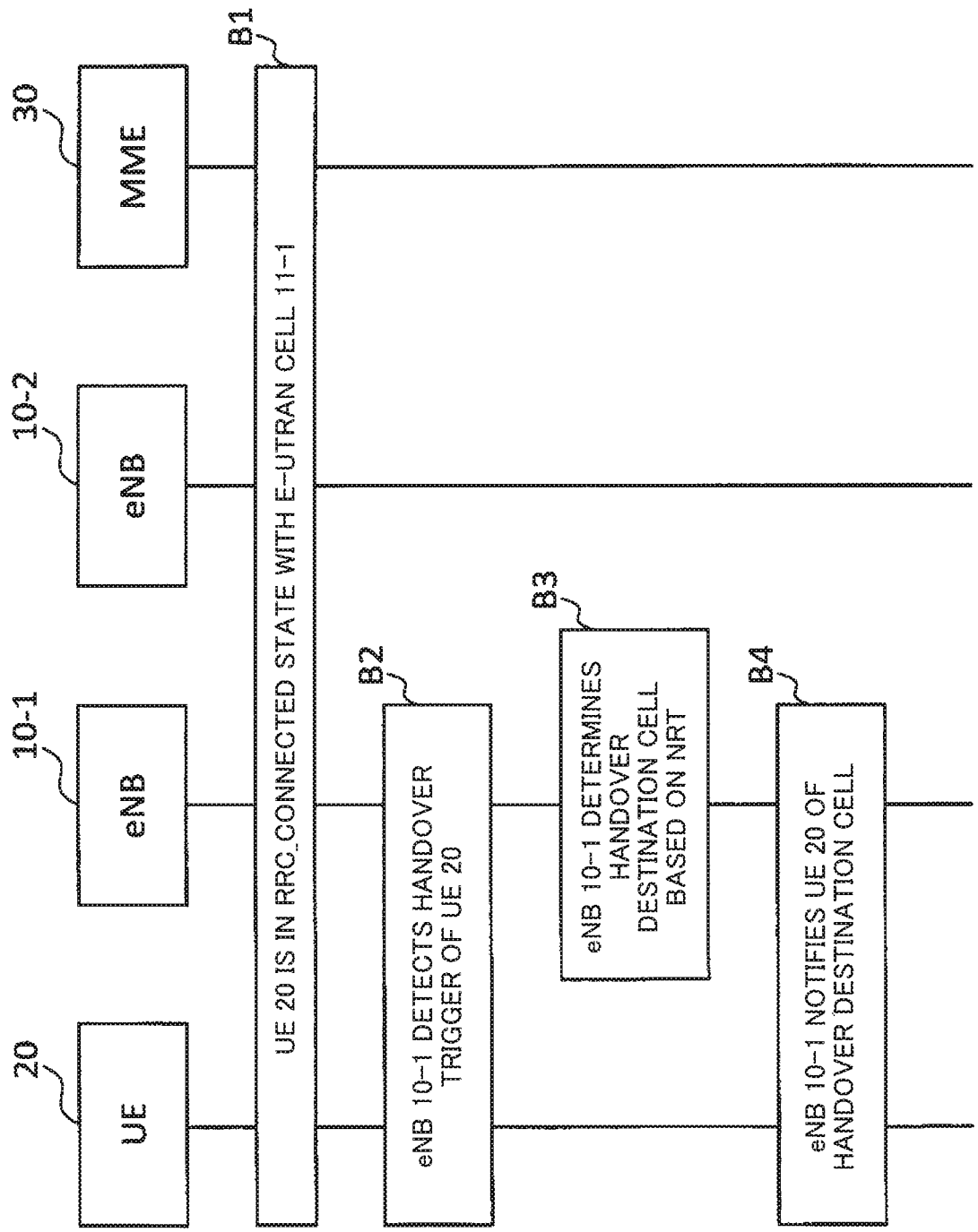
FIG. 5 is a sequence diagram illustrating an example of a processing sequence during handover in the wireless communication system according to the present exemplary embodiment.

FIG. 5 is a sequence diagram illustrating an example of a processing sequence during handover.

The following describes Steps in FIG. 5.

Step B1:

The UE 20 is in a connected state to the E-UTRAN cell 11-1 (RRC_CONNECTED state).

Step B2:

The processing unit 103 of the eNB 10-1 determines that the UE 20 needs to be handed over from the E-UTRAN cell 11-1 to another cell, based on the measurement result reported from the UE 20.

Step B3:

The processing unit 103 of the eNB 10-1 determines a handover destination cell of the UE 20 based on the service information of the neighbour cell registered with the NRT.

Step B4:

The processing unit 103 of the eNB 10-1 notifies the UE 20 of the handover destination cell. After the handover, the UE 20 continues communication in the handover destination cell.

(2-3) Operation of Determining Handover Destination Cell

Next, a detailed description is made on the operation of determining a handover destination cell, which is carried out at Step B3 in FIG. 5.

Figure 6:
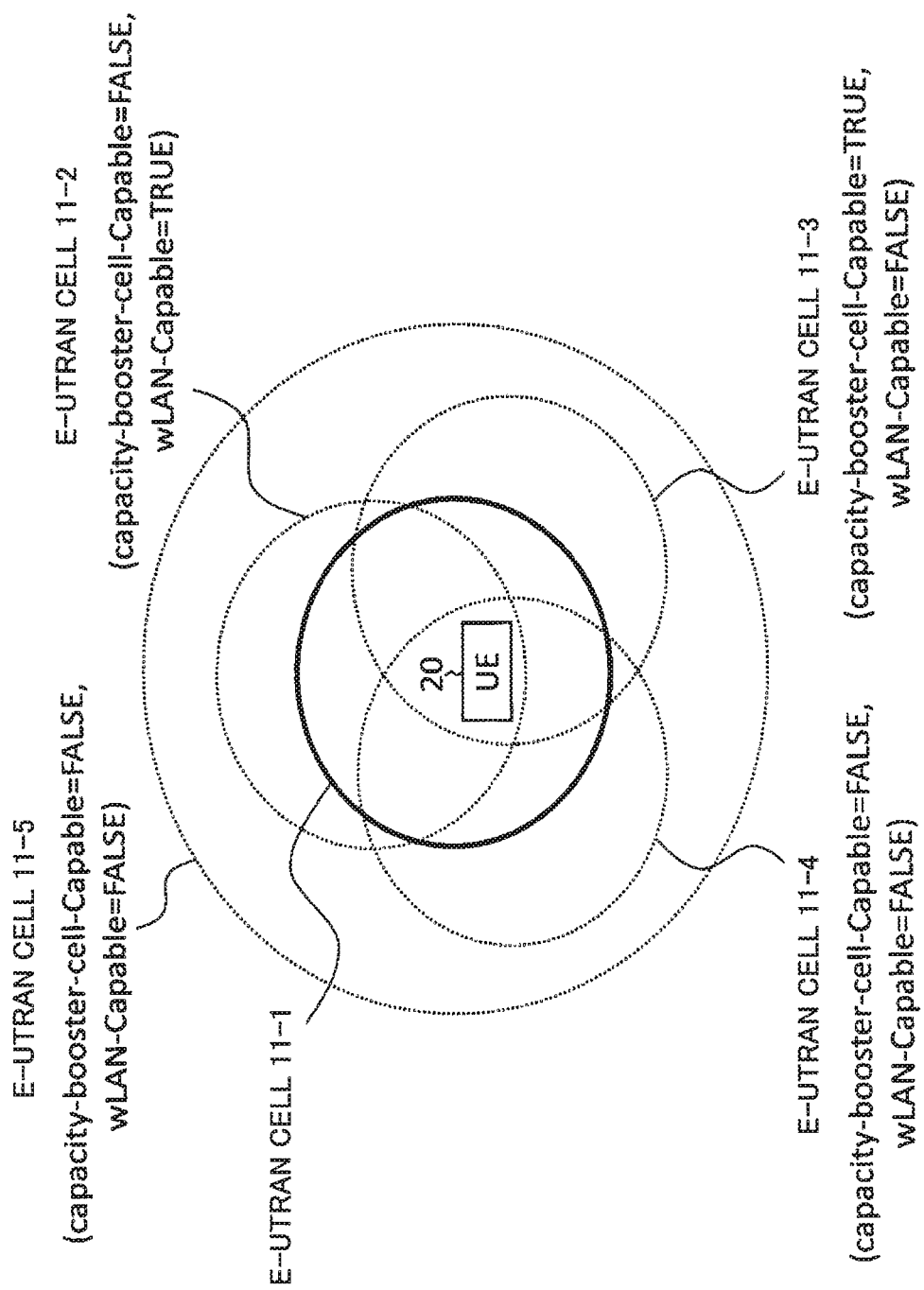
FIG. 6 is a diagram illustrating an example of the arrangement of cells of the wireless communication system according to the present exemplary embodiment.

FIG. 6 is a diagram illustrating an example of the arrangement of cells of the wireless communication system.

It is assumed that the arrangement of cells of the wireless communication system according to the present exemplary embodiment is as illustrated in FIG. 6. In addition, it is assumed that the eNB 10-1 registers, with the NRT, E-UTRAN cells 11-3 to 11-5 in addition to the above-described E-UTRAN cell 11-2 as being neighbour cells at a point of time when a handover trigger is generated at Step B2 in FIG. 5. An example of the NRT at this time is illustrated in FIG. 7.

FIG. 7 is a diagram illustrating an example of the NRT in the wireless communication system.

The value of "capacity-booster-cell-Capable" and the value of "wLAN-Capable" of each of the E-UTRAN cells 11-2 to 11-5 are as follows:

E-UTRAN cell 11-2 (capacity-booster-cell-Capable= FALSE, wLAN-Capable=TRUE)

E-UTRAN cell 11-3 (capacity-booster-cell-Capable= TRUE, wLAN-Capable=FALSE)

E-UTRAN cell 11-4 (capacity-booster-cell-Capable= FALSE, wLAN-Capable=FALSE)

E-UTRAN cell 11-5 (capacity-booster-cell-Capable= FALSE, wLAN-Capable=FALSE)

In addition, it is assumed that the E-UTRAN cell 11-5 is a cell of a macro base station. In addition, it is assumed that the E-UTRAN cells 11-1 to 11-4 are cells of a micro base station, a pico base station, or a femto base station having a cell diameter smaller than the cell of a macro base station and disposed for hot spot countermeasure.

The processing unit 103 of the eNB 10-1 compares the value of QCI IE in E-RAB Level QoS Parameters and the values of UE Aggregate Maximum Bit Rate Downlink IE and Aggregate Maximum Bit Rate Uplink IE in UE Aggregate Maximum Bit Rate, which are prescribed in 3GPP TS36.413 V12.1.0 (NPL 6), with the past statistical information. The processing unit 103 of the eNB 10-1 then estimates, based on a result of the comparison, an amount of data transmitted and received by the UE 20 in the past.

Further, the processing unit 103 of the eNB 10-1 estimates, based on the value of horizontal Velocity in Location Information element prescribed in 3GPP TS36.331 V12.1.0 (NPL 4), a speed of movement of the UE 20.

The processing unit 103 of the eNB 10-1 performs handover control whereby a handover destination cell of the UE 20 is determined based on the NRT in consideration of subscriber information, such as an amount of data transmitted and received by the UE 20 in the past, a speed of movement of the UE 20, and the presence or absence of a function of a wireless LAN terminal in the UE 20.

Figure 8:
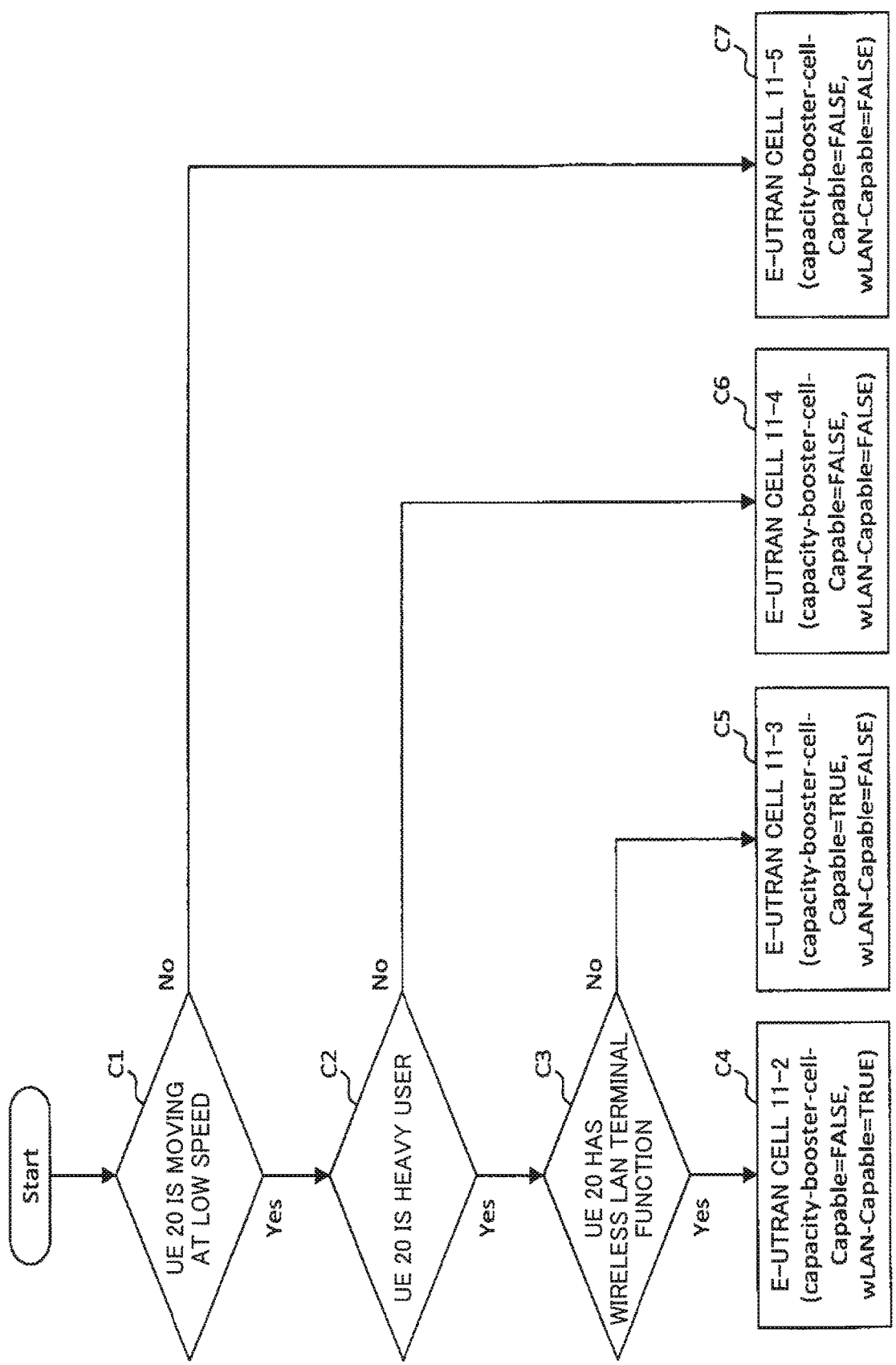
FIG. 8 is a flowchart illustrating an example of a process flow during determination of a handover destination cell in the wireless communication system according to the present exemplary embodiment.

FIG. 8 is a chart illustrating an example of a process flow indicating a determination logic during determination of a handover destination cell. However, the process flow is merely exemplary and it is assumed that different determination logics may be implemented depending on the policy of a telecommunications carrier and the policy for network design. The following describes Steps in FIG. 8.

Step C1:

The processing unit 103 of the eNB 10-1 determines whether the UE 20 is moving at a low speed. For example, the processing unit 103 determines that the UE 20 is moving at a low speed when a speed of the movement of the UE 20 is less than a threshold value.

When the UE 20 is moving at a low speed, the processing proceeds to Step C2.

On the other hand, when the UE 20 is not moving at a low speed (moving at a high speed), the processing proceeds to Step C7.

Step C2:

The processing unit 103 of the eNB 10-1 determines whether the user of the UE 20 is a heavy user. For example, the processing unit 103 determines that the user of the UE 20 is a heavy user when an amount of data transmitted and received by the UE 20 in the past (which may be the total amount of data in the past and the amount of data within the latest certain period) is equal to or greater than a threshold value.

When the user of the UE 20 is a heavy user, the processing proceeds to Step C3.

On the other hand, when the user of the UE 20 is not a heavy user, the processing proceeds to Step C6.

Step C3:

The processing unit 103 of the eNB 10-1 determines whether the UE 20 has a function of a wireless LAN terminal.

When the UE 20 has a function of a wireless LAN terminal, the processing proceeds to Step C4.

On the other hand, when the UE 20 does not have a function of a wireless LAN terminal, the processing proceeds to Step C5.

Step C4:

The processing proceeds to Step C4 when the UE 20 is moving at a low speed, the user of the UE 20 is a heavy user, and the UE 20 has a function of a wireless LAN terminal.

In this case, the processing unit 103 of the eNB 10-1 selects the E-UTRAN cell 11-2 as being a handover destination cell in a manner as follows:

The UE 20 is moving at a low speed. Thus, the E-UTRAN cells 11-2 to 11-4 are firstly selected, which are cells of a micro base station, a pico base station, or a femto base station having a small cell diameter and disposed for hot spot countermeasure.

In addition, the UE 20 has a function of a wireless LAN terminal. Thus, the E-UTRAN cell 11-2 having a function of a wireless LAN base station is subsequently selected finally as being a handover destination cell from among the E-UTRAN cells 11-2 to 11-4.

This allows the UE 20 of the heavy user to be handed over to the E-UTRAN cell 11-2 having a function of a wireless LAN base station. Consequently, the load on the macro base station can be reduced.

Step C5:

The processing proceeds to Step C5 when the UE 20 is moving at a low speed, the user of the UE 20 is a heavy user, and the UE 20 does not have a function of a wireless LAN terminal.

In this case, the processing unit 103 of the eNB 10-1 selects the E-UTRAN cell 11-3 as being a handover destination cell in a manner as follows:

The UE 20 is moving at a low speed. Thus, the E-UTRAN cells 11-2 to 11-4 are firstly selected, which are cells of a micro base station, a pico base station, or a femto base station having a small cell diameter and disposed for hot spot countermeasure.

In addition, the UE 20 does not have a function of a wireless LAN terminal, and the user of the UE 20 is a heavy user. Thus, the E-UTRAN cell 11-3 not having a function of a wireless LAN base station and being a cell for dynamically adding a communication capacity is subsequently selected finally as being a handover destination cell from among the E-UTRAN cells 11-2 to 11-4.

This allows the UE 20 of the heavy user to be handed over to the E-UTRAN cell 11-3 being a cell for dynamically adding a communication capacity. Consequently, the load on the macro base station can be reduced.

Step C6:

The processing proceeds to Step C6 when the UE 20 is moving at a low speed, and the user of the UE 20 is not a heavy user.

In this case, the processing unit 103 of the eNB 10-1 selects the E-UTRAN cell 11-4 as being a handover destination cell in a manner as follows:

The UE 20 is moving at a low speed. Thus, the E-UTRAN cells 11-2 to 11-4 are firstly selected, which are cells of a micro base station, a pico base station, or a femto base station having a small cell diameter and disposed for hot spot countermeasure.

In addition, the user of the UE 20 is not a heavy user. Thus, the E-UTRAN cell 11-4 not having a function of a wireless LAN base station and not being a cell for dynamically adding a communication capacity is subsequently selected finally as being a handover destination cell from among the E-UTRAN cells 11-2 to 11-4.

This allows the UE 20 of the ordinary user who is not a heavy user to be handed over to the E-UTRAN cell 11-4 not having a function of a wireless LAN base station and not being a cell for dynamically adding a communication capacity.

This result facilitates handover of the UE 20 of a heavy user to a cell having a function of a wireless LAN base station and to a cell for dynamically adding a communication capacity. Consequently, the load on the macro base station can be reduced.

Step C7:

The processing proceeds to Step C7 when the UE 20 is moving at a high speed.

In this case, the processing unit 103 of the eNB 10-1 selects the E-UTRAN cell 11-5 as being a handover destination cell in a manner as follows:

The UE 20 is moving at a high speed. Thus, the E-UTRAN cell 11-5 being a cell of a macro base station having a large cell diameter is selected finally as being a handover destination cell.

(3) Advantageous Effects of Present Exemplary Embodiment

As described above, the present invention addresses some cases in which the system information defined in 3GPP TS36.331 v12.1.0 (NPL 4) and 3GPP TS25.331 v12.1.0 (NPL 5) may alone be insufficient for an eNB to determine a handover destination cell of a UE.

This problem becomes evident when the eNBs 10 are densely arranged. Herein, assumed is a Heterogeneous Network where a cell formed by a macro base station disposes therein a micro base station, a pico base station, or a femto base station that forms a cell having a cell diameter smaller than that of the macro base station.

For example, when a cell of a macro base station includes an area where user traffic is concentrated (hot spot), it is necessary not to send large-volume traffic occurring in the area to the macro base station as much as possible. Thus, a source eNB has to select, as being a handover destination cell of a UE, a cell of a base station with a function of a wireless LAN base station or a cell for dynamically adding a communication capacity. However, the service information defined in 3GPP TS36.331 v12.1.0 (NPL 4) and 3GPP TS25.331 v12.1.0 (NPL 5) alone does not allow determining whether a neighbour cell is a cell of a base station with a function of a wireless LAN base station or a cell for dynamically adding a communication capacity. Accordingly, large-volume traffic is sent to the macro base station, and this may deteriorate the user experience of many users by the increased load on the macro base station.

As a solution for the above-described problem, there is conceived a method whereby a base station can use information (hereinafter, service information) relating to whether a neighbour cell is a cell of another base station with a function of a wireless LAN base station or a cell for dynamically adding a communication capacity. However, when the base station cannot automatically acquire and reflect the service information in the processing, a telecommunications carrier constructing the above-described Heterogeneous Network has to manually register the service information of each neighbour cell for every disposition of a base station. Since the man-hour of operation by the telecommunications carrier increases with the increase in the number of base stations, the increase in Operational Expenditure (hereinafter, OPEX) is inevitable.

In contrast, the eNB 10 in the present exemplary embodiment acquires, via the UE 20 that is in a connected state to the own cell, service information of each neighbour cell (two new information elements "capacity-booster-cell-Capable" and "wLAN-Capable" are added) received by the UE 20, and registers the acquired service information with an NRT.

Therefore, the eNB 10 is able to obtain information that relates to whether a neighbour cell is a cell of a base station with a function of a wireless LAN base station or a cell for dynamically adding a communication capacity, which is sufficient to determine a handover destination cell of the UE 20. This allows the UE 20 to be handed over to a cell of a base station with a function of a wireless LAN base station or a cell for dynamically adding a communication capacity.

For example, large-volume traffic of the UE 20 of a heavy user occurring in a hot spot can be prevented from being sent to a macro base station. Consequently, the load on the macro base station can be reduced.

In addition, the eNB 10 in the present exemplary embodiment acquires service information of each neighbour cell by itself and registers the acquired service information of the neighbour cell with an NRT.

Therefore, there is no need for a telecommunications carrier to manually register the service information of the neighbour cell with the NRT. Consequently, the OPEX can be reduced.

(4) Modification Examples of Present Exemplary Embodiment

The present invention has been described above with reference to the exemplary embodiment. However, the present invention is not limited to the above-described exemplary embodiment. Various modifications that are understandable to those skilled in the art can be made to the configuration and the detail of the present invention within the scope of the present invention. The following describes modification examples of the present exemplary embodiment.

(4-1) In the above-described exemplary embodiment, an eNB adds two information elements "capacity-booster-cell-Capable" and "wLAN-Capable" to service information. However, an eNB does not necessarily add both of the two information elements, but is only required to add at least one of the two information elements. This configuration also allows a UE to be handed over to a cell of a base station with a function of a wireless LAN base station or a cell for dynamically adding a communication capacity, and produces an advantageous effect similar to that of the above-described exemplary embodiment.

(4-2) In the above-described exemplary embodiment, an eNB does not specify the capability of a UE from the UE Category prescribed in 3GPP TS36.306 V12.0.0 (NPL 7). However, an eNB may specify the capability of a UE from the UE Category. For example, it is conceivable that an eNB determines that a user of a UE of Category 6 or Category 7 of the UE Category is a heavy user.

(4-3) In the above-described exemplary embodiment, an eNB does not include, in service information, an information element indicating "whether a cell is part of a SCG." However, an eNB may include the information element in service information. In general, a cell of an SeNB has a cell diameter smaller than that of a cell of an MeNB, and is capable of large-volume data communication. Thus, for example, it is conceivable that a UE of a heavy user can be preferentially handed over to part of cells of an SCG.

(4-4) In the above-described exemplary embodiment, an eNB does not include, in service information, an information element indicating "whether Machine to Machine (hereinafter, M2M) is used in a cell." However, an eNB may include the information element in service information. For example, a UE using M2M is characterized in being disposed in equipment or the like and transmitting information at a fixed time of a day. Increase in the number of such UEs may possibly cause congestion in an eNB. In addition, some eNBs include a mechanism for controlling congestion. Thus, for example, it is conceivable that a UE using M2M is preferentially handed over to a cell of an eNB with the mechanism for controlling congestion.

(4-5) In the above-described exemplary embodiment, handover control is applied to handover between E-UTRAN cells. However, the handover control in the above-described exemplary embodiment may be applied to handover between an E-UTRAN cell and a cell of another wireless communication scheme (e.g., GSM EDGE Radio Access Network (GERAN), Code Division Multiple Access (CDMA) 2000, wireless LAN, and Worldwide Interoperability for Microwave Access (WiMAX)), and may be applied to handover between cells of the other identical wireless communication scheme.

(4-6) In the above-described exemplary embodiment, an eNB broadcasts service information using SystemInformationBlockType1 message (see FIG. 4) defined in 3GPP TS36.331V12.1.0 (NPL 4). However, an eNB may add a new information element to another kind of information broadcasted in an LTE wireless communication system and to system information broadcasted in a wireless communication system using a scheme other than LTE.

(4-7) In the above-described exemplary embodiment, a UE reports, in a procedure of execution of the ANR, service information including a new added information element to an eNB. However, the service information may be included in information that is reported from a UE by using a function called Minimization Drive Tests (hereinafter, referred to as MDT) prescribed in 3GPP TS37.320 V12.0.0 (NPL 8). The MDT refers to a function of making a UE used by a subscriber to take over the work of a telecommunications carrier who used to measure the communication quality of a cell while moving by an automobile on which a measuring instrument is mounted, and making an eNB to report a result of the measurement. The MDT enables the reduction of the OPEX.

(4-8) In the above-described exemplary embodiment, an eNB adds two information elements "capacity-booster-cell-Capable" and "wLAN-Capable" to service information. However, in addition to these two information elements, an eNB may add another information element that can enhance the degree of satisfaction of a user of an UE. Such information elements that are conceivable are as follows:

Information element that indicates whether an eNB forming a cell is a Relay Node (Hereinafter, referred to as a RN) (An RN is assumed to have small coverage. Thus, for example, it is conceivable that a UE moving at a high speed is not handed over to a cell of an RN. This makes it possible to avoid deterioration of a User Experience.)

Information element that indicates whether a cell is a cell dedicated for downlink communication or a cell prioritized for downlink communication (For example, it is conceivable that a UE in execution of downloading data may be handed over to the cell, whereas a UE in telephone communication is not handed over to the cell.)

Information element that indicates whether a cell is split using the function of Cell splitting executed by the function of an Active Antenna System prescribed in 3GPP TR37.822 V1.2.0 (NPL 9) (When large-volume traffic occurs permanently or frequently in a certain area, a cell can be split. Thus, for example, it is conceivable that a UE of a heavy user is preferentially handed over to the split cell.)

(4-9) In the above-described exemplary embodiment, an eNB acquires service information of each neighbour cell by measurement report from an UE. However, an eNB may acquire, by its own, service information of each neighbour cell by using a function, called a Network Monitoring Mode, of measuring a surrounding radio environment. Alternatively, an eNB may acquire service information of each neighbour cell through a message received from a neighbour eNB via an X2 interface, an Iur interface, an Iurh interface, an Iurg interface or the like, through a RAN Information Management (hereinafter, referred to as RIM) procedure defined in 3GPP TS36.413 V12.1.0 (NPL 6), or from an Operation & Maintenance (O & M) server.

(4-10) In the above-described exemplary embodiment, a UE in a RRC_CONNECTED state in an LTE network acquires service information of each neighbour cell. However, as defined in 3GPP TS25.484V11.1.0 (NPL 9), a UE in an IDLE mode in a 3G network may acquire service information of each neighbour cell and report the acquired service information to a base station.

(4-11) In the above-described exemplary embodiment, an eNB manages an NRT. However, a device that manages a plurality of eNBs may manage an NRT of each of the eNBs.

Note that a part or all of the above-described exemplary embodiments can be described as the following Supplementary notes but the present invention is not limited to the following.

Supplementary Note 1

A base station including:
a storage unit that stores a neighbour relation table; and
a processing unit, wherein
the storage unit
stores the neighbour relation table, and
the processing unit
receives service information of a neighbour cell that is transmitted by another base station forming the neighbour cell adjacent to its own cell and that includes at least one of an information element indicating whether the other base station has a function of a wireless LAN base station and an information element indicating whether the neighbour cell is a cell for dynamically adding a communication capacity, and
registers the service information of the neighbour cell with the neighbour relation table.

Supplementary Note 2

The base station according to Supplementary note 1, wherein
the processing unit transmits, into the own cell, the service information of the own cell.

Supplementary Note 3

The base station according to Supplementary note 2, wherein the processing unit further includes, in the service information of the own cell, an information element indicating whether the own cell is part of an SCG.

Supplementary Note 4

The base station according to Supplementary note 2 or 3, wherein
the processing unit further includes, in the service information of the own cell, an information element indicating whether M2M is used in the own cell.

Supplementary Note 5

The base station according to any one of Supplementary notes 2 to 4, wherein
the processing unit further includes, in the service information of the own cell, an information element indicating whether the local base station is a relay node.

Supplementary Note 6

The base station according to any one of Supplementary notes 2 to 5, wherein
the processing unit further includes, in the service information of the own cell, either an information element indicating whether the own cell is a cell dedicated for downlink communication or an information element indicating whether the own cell is a cell prioritized for downlink communication.

Supplementary Note 7

The base station according to any one of Supplementary notes 2 to 6, wherein
the processing unit
broadcasts, within the own cell, the service information of the own cell, and
receives, from a terminal in a connected state to the own cell, the service information of the neighbour cell received by the terminal from the neighbour cell.

Supplementary Note 8

The base station according to any one of Supplementary notes 2 to 6, wherein
the processing unit transmits the service information of the own cell and receives the service information of the neighbour cell to and from the other base station forming the neighbour cell via a predetermined interface.

Supplementary Note 9

The base station according to any one of Supplementary notes 2 to 8, wherein
the processing unit determines a handover destination cell of a terminal in a connected state to the own cell, based on the service information of the neighbour cell registered with the neighbour relation table.

Supplementary Note 10

The base station according to Supplementary note 9, wherein
the processing unit determines a handover destination cell of a terminal in a connected state to the own cell, further using information indicating an amount of data transmitted and received by the terminal in the past, a speed of movement of the terminal, and whether the terminal has a function of a wireless LAN terminal.

Supplementary Note 11

A wireless communication system including:
a terminal; and
a plurality of base stations, wherein
each of the plurality of base stations
receives service information of a neighbour cell that is transmitted by another base station forming the neighbour cell adjacent to its own cell and that includes at least one of an information element indicating whether the other base station has a function of a wireless LAN base station and an information element indicating whether the neighbour cell is a cell for dynamically adding a communication capacity, and
registers the service information of the neighbour cell with a neighbour relation table.

Supplementary Note 12

The wireless communication system according to Supplementary note 11, wherein
each of the plurality of base stations transmits, into the own cell, the service information of the own cell.

Supplementary Note 13

The wireless communication system according to Supplementary note 12, wherein
each of the plurality of base stations
broadcasts, within the own cell, the service information of the own cell, and
receives, from a terminal in a connected state to the own cell, the service information of the neighbour cell received by the terminal from the neighbour cell.

Supplementary Note 14

The wireless communication system according to Supplementary note 12 or 13, wherein
each of the plurality of base stations determines a handover destination cell of a terminal in a connected state to the own cell, based on the service information of the neighbour cell registered with the neighbour relation table.

Supplementary Note 15

A communication method by a base station, including:
a reception step of receiving service information of a neighbour cell that is transmitted by another base station forming the neighbour cell adjacent to a own cell and that includes at least one of an information element indicating whether the other base station has a function of a wireless LAN base station and an information element indicating whether the neighbour cell is a cell for dynamically adding a communication capacity; and
a registration step of registering the service information of the neighbour cell with a neighbour relation table.

Supplementary Note 16

The communication method according to Supplementary note 15, further including
a transmission step of transmitting, into the own cell, the service information of the own cell.

Supplementary Note 17

The communication method according to Supplementary note 16, wherein
the transmission step includes broadcasting, within the own cell, the service information of the own cell, and
the reception step includes receiving, from a terminal in a connected state to the own cell, the service information of the neighbour cell received by the terminal from the neighbour cell.

Supplementary Note 18

The communication method according to Supplementary note 16 or 17, further including
a determination step of determining a handover destination cell of a terminal in a connected state to the own cell, based on the service information of the neighbour cell registered with the neighbour relation table.

This application is based upon and claims the benefit of priority from Japanese Patent Application No. 2014-85221, filed on Apr. 17, 2014, the disclosure of which is incorporated herein in its entirety by reference.

What is claimed is:

1. A second base station which forms a second cell, the second base station configured to:
   instruct a terminal device to measure a communication quality and send a report with information concerning the measured communication quality to neighbor cells;
   receive a first message from a first base station, wherein the first message includes a first information element indicating whether a first cell in a main coverage area is splitting using a function of Cell splitting into a first split cell and a second split cell by splitting a beam from the main coverage area into smaller coverage areas;
   update a neighbor relation table (NRT) based on the first message and the report;
   determine, based on the NRT, a handover destination cell of the terminal, wherein the terminal is in a connected state with the second cell, wherein the handover destination or a reselection destination cell is the first split cell or the second split cell within the main coverage area; and
   notify the terminal of the determined cell destination or reselection.

2. The second base station according to claim 1, wherein the first base station is configured to transmit the first message to the second base station using an interface between the first base station and the second base station.

3. The second base station according to claim 1, wherein the first message comprises at least one of a second information element indicating whether the first base station has a function of a wireless LAN (Local Area Network) base station and a third information element indicating whether the first cell is a cell for dynamically adding a communication capacity.

4. The second base station according to claim 1, wherein the handover destination cell is a reselection cell.

5. A method for a second base station which forms a second cell, the method comprising:
   instructing a terminal device to measure a communication quality and send a report with information concerning the measured communication quality to neighbor cells;
   receiving a first message from a first base station, wherein the first message includes a first information element indicating whether a first cell in a main coverage area is splitting using a function of Cell splitting into a first split cell and a second split cell by splitting a beam from the main coverage area into smaller coverage areas;
   updating a neighbor relation table (NRT) based on the first message and the report; and
   determining, based on the NRT, a handover destination cell of the terminal, wherein the terminal is in a connected state with the second cell, wherein the handover destination or a reselection destination cell is the first split cell or the second split cell within the main coverage area; and
   notifying the terminal of the determined cell destination or reselection.

6. The method according to claim 5, wherein the first base station is configured to transmit the first message to the second base station using an interface between the first base station and the second base station.

7. The method according to claim 5, wherein the first message comprises at least one of a second information element indicating whether the first base station has a function of a wireless LAN (Local Area Network) base station and a third information element indicating whether the first cell is a cell for dynamically adding a communication capacity.

* * * * *